United States Patent
Zhang et al.

(10) Patent No.: US 12,475,190 B2
(45) Date of Patent: Nov. 18, 2025

(54) COMPUTING DEVICE, COMPUTING APPARATUS AND METHOD OF WARP ACCUMULATION

(71) Applicant: Shanghai Biren Technology Co., Ltd, Shanghai (CN)

(72) Inventors: Yufei Zhang, Shanghai (CN); Zhu Liang, Shanghai (CN); Min Gao, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 930 days.

(21) Appl. No.: 17/686,409

(22) Filed: Mar. 4, 2022

(65) Prior Publication Data
US 2022/0284075 A1    Sep. 8, 2022

(30) Foreign Application Priority Data
Mar. 8, 2021    (CN) .......................... 202110251644.8

(51) Int. Cl.
*G06F 7/509* (2006.01)
*G06F 9/30* (2018.01)
*G06F 17/16* (2006.01)

(52) U.S. Cl.
CPC .............. *G06F 17/16* (2013.01); *G06F 7/509* (2013.01); *G06F 9/3009* (2013.01)

(58) Field of Classification Search
CPC ...... G06F 17/16; G06F 9/3001; G06F 9/3009; G06F 9/30036; G06F 7/509–5095; G06F 7/5443
See application file for complete search history.

(56) References Cited

U.S. PATENT DOCUMENTS

| | | | | |
|---|---|---|---|---|
| 2020/0342632 A1* | 10/2020 | Frumkin | ................ | G06F 7/544 |
| 2022/0365750 A1* | 11/2022 | Bharambe | ............... | G06F 7/483 |
| 2023/0289398 A1* | 9/2023 | Choquette | ............ | G06F 9/3887 |
| 2023/0315479 A1* | 10/2023 | Thuerck | ............... | G06F 9/3009 |
| | | | | 712/7 |
| 2024/0095302 A1* | 3/2024 | Tu | .......... | G06F 7/5443 |
| 2024/0168717 A1* | 5/2024 | Jiang | .................. | G06F 7/5443 |
| 2024/0169021 A1* | 5/2024 | Parra Osorio | ........ | G06F 7/5443 |
| 2025/0068423 A1* | 2/2025 | Parra Osorio | ........ | G06F 9/3851 |

* cited by examiner

*Primary Examiner* — Matthew D Sandifer
(74) *Attorney, Agent, or Firm* — JCIP GLOBAL INC.

(57) ABSTRACT

The embodiments of the disclosure relate to a computing device, a computing apparatus, and a method of warp accumulation and relate to the field of computers. The computing device includes a storage unit and an accumulation computing unit coupled to the storage unit. The accumulation computing unit is configured to receive, from a vector processing unit coupled to the computing device, a first warp accumulation instruction, a plurality of first values corresponding to a warp lane number, and a first storage address; generate a current accumulation result based on the plurality of first values in response to the first warp accumulation instruction; and store the current accumulation result in the first storage address in the storage unit to be read by the vector processing unit. In this way, accumulation in a warp may be decoupled to dedicated hardware for processing, and overall accumulation performance may thus be significantly improved.

10 Claims, 5 Drawing Sheets

COMPUTING DEVICE, COMPUTING APPARATUS AND METHOD OF WARP ACCUMULATION

CROSS-REFERENCE TO RELATED APPLICATION

This application claims the priority benefit of China application serial no. 202110251644.8, filed on Mar. 8, 2021. The entirety of the above-mentioned patent application is hereby incorporated by reference herein and made a part of this specification.

BACKGROUND

Technical Field

The disclosure generally relates to the field of computers, and in particular, relates to a computing device, a computing apparatus, and a method of warp accumulation.

Description of Related Art

A plurality of warps may be included in a vector processing unit, and accumulation often occurs within a warp. For instance, in a recurrent neural network (RNN), a large number of matrix multiplication vectors (MMVs) and the add operation are provided. In this operation, accumulation results may be kept on a warp basis. Finally, accumulation within the warp is required to generate the final result, which may be achieved by: constantly shuffling the values in the warp lanes (also called threads) and then adding the shuffled values or performing accumulation through the use of shared storage units.

Either way, a large number of instructions may be consumed to complete, presenting a "long tail" effect. For instance, if 1024 elements in the accumulation dimension are given, the result is accumulated into the warp through 16 MMV instructions, and then 15 instructions are required for accumulation in the warp, which causes a huge overhead of up to 94%.

SUMMARY

The disclosure provides a computing device, computing apparatus, and a method of warp accumulation capable of decoupling accumulation in a warp to dedicated hardware for processing, and overall accumulation performance may thus be significantly improved.

According to the first aspect of the disclosure, a computing device is provided. The computing device includes a storage unit and an accumulation computing unit coupled to the storage unit. The accumulation computing unit is configured to receive, from a vector processing unit coupled to the computing device, a first warp accumulation instruction, a plurality of first values corresponding to a warp lane number, and a first storage address; generate a current accumulation result based on the plurality of first values in response to the first warp accumulation instruction; and store the current accumulation result in the first storage address in the storage unit to be read by the vector processing unit.

According to the second aspect of the disclosure, a computing apparatus is provided. The computing apparatus includes the computing device according to the first aspect and the vector processing unit coupled to the computing device. The vector processing unit is configured to send the first warp accumulation instruction, the plurality of first values corresponding to the warp lane number, and the first storage address to the accumulation computing unit in the computing device; and read the current accumulation result from the first storage address in the storage unit in the computing device.

According to the third aspect of the disclosure, the disclosure provides a method of warp accumulation. The method includes the following steps. A vector processing unit sends a first warp accumulation instruction, a plurality of first values corresponding to a warp lane number, and a first storage address to an accumulation computing unit. The accumulation computing unit generates a current accumulation result based on the plurality of first values in response to the first warp accumulation instruction. The accumulation computing unit stores the current accumulation result in the first storage address in a storage unit coupled to the accumulation computing unit to be read by the vector processing unit. The vector processing unit reads the current accumulation result from the first storage address in the storage unit.

It should be understood that the content described in this section is not intended to identify key or important features of the embodiments of the disclosure, nor is it intended to limit the scope of the disclosure. Other features of the disclosure will be easily understood through the following description.

BRIEF DESCRIPTION OF THE DRAWINGS

The abovementioned and other features, advantages and aspects of the various embodiments of the disclosure will become more apparent in combination with the accompanying drawings and with reference to the following detailed description. In the drawings, the same or similar reference numbers refer to the same or similar elements.

DESCRIPTION OF THE EMBODIMENTS

The exemplary embodiments of the disclosure will be described below with reference to the accompanying drawings. Various details of the embodiments of the disclosure are included to facilitate understanding, but they should be regarded as merely exemplary. Therefore, a person having ordinary skill in the art should realize that various changes and modifications may be made to the embodiments described herein without departing from the scope and spirit of the disclosure. Likewise, for clarity and conciseness, description of commonly-known functions and structures are omitted in the following description.

The term "including" and its variants used in the specification means open-ended inclusion, that is, "including but not limited to". Unless specifically stated, the term "or" means "and/or". The term "based on" means "based at least in part on." The terms "one exemplary embodiment" and "one embodiment" mean "at least one exemplary embodiment". The term "another embodiment" means "at least one additional embodiment". The terms "first", "second", etc. may refer to different or the same objects. The following may also include other explicit and implicit definitions.

As described above, in the related art, accumulation within a warp requires a large amount of instruction overhead.

In order to solve the above problems, the disclosure provides a computing device, computing apparatus, and a method of warp accumulation capable of decoupling accumulation in a warp to dedicated hardware for processing, and overall accumulation performance may thus be significantly improved.

Figure 1:
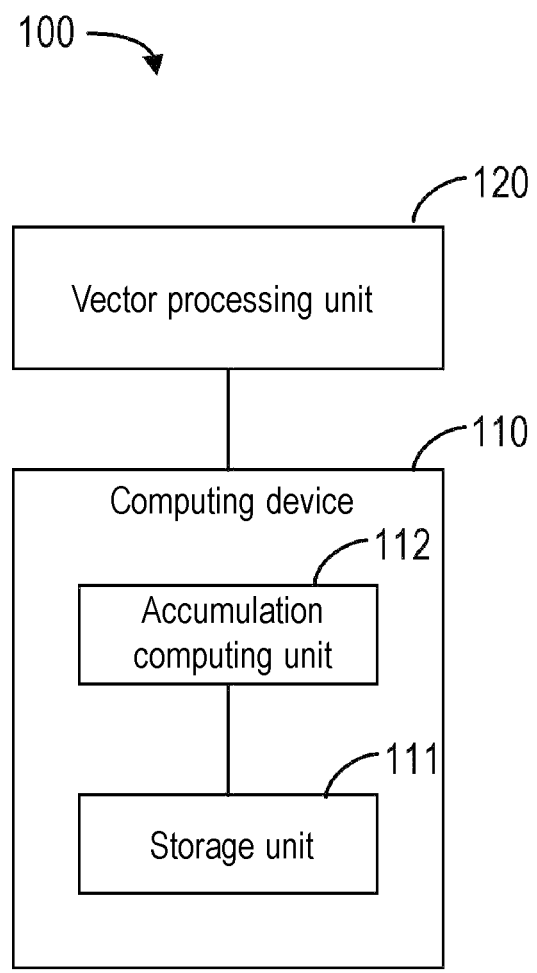
FIG. 1 is a schematic diagram of a computing apparatus 100 according to an embodiment of the disclosure.

FIG. 1 is a schematic block diagram illustrating a computing apparatus 100 according to an embodiment of the disclosure.

As shown in FIG. 1, the computing apparatus 100 includes a computing device 110 and a vector processing unit 120 coupled to the computing device 110.

Regarding the computing device 110, it may include but not limited to a load store unit (LSU), for example. It should be understood that this is only an example, and the computing device 110 may also be implemented by using other suitable circuits. The computing device 110 may include a storage unit 111 and an accumulation computing unit 112 coupled to the storage unit 111.

Regarding the storage unit 111, it may be configured to store an accumulation result generated by the accumulation computing unit 112. The storage unit 111 may include a random access memory (RAM) including but not limited to a static random access memory (SRAM), for example. It should be understood that this is only an example, and the storage unit 111 may also adopt other suitable memories. The scope of the disclosure is not limited herein.

Regarding the accumulation computing unit 112, it may be implemented by any suitable circuit. The accumulation computing unit 112 may be configured to receive a first warp accumulation instruction, a plurality of first values corresponding to a warp lane number, and a first storage address from the vector processing unit 120. The first warp accumulation instruction, the plurality of first values, and the first storage address may be associated with a first warp in the vector processing unit 120. For instance, the first warp in the accumulation computing unit 112 may include a plurality of registers for storing the plurality of first values. The first warp may include, for example, 32 lanes, and the plurality of first values may include, for example, 32 first values. The first values are, for example, the accumulation results inside the corresponding lanes or threads. The first values include but not limited to floating point numbers, for example.

The accumulation computing unit 112 may further be configured to generate a current accumulation result based on the plurality of first values in response to the first warp accumulation instruction. For instance, the accumulation computing unit 112 may further be configured to accumulate the plurality of first values to generate the current accumulation result in response to the first warp accumulation instruction.

The accumulation computing unit 112 may be further configured to store the current accumulation result in the first storage address in the storage unit 111 to be read by the vector processing unit 120.

Regarding the vector processing unit 120 (also referred to as a vector processing engine), it may include a plurality of warps, and each warp has a plurality of lanes, e.g., 32 lanes. Although one vector processing unit 120 and one accumulation computing unit 112 are shown in FIG. 1, it should be understood that there may be more than one vector processing unit 120. Correspondingly, there may also be a plurality of accumulation computing units 112. The accumulation computing units 112 may correspond to the vector processing units 120 one-to-one.

The vector processing unit 120 may be configured to send the first warp accumulation instruction, the plurality of first values corresponding to the warp lane number, and the first storage address to the accumulation computing unit 112 in the computing device 110. The vector processing unit 120 may be further configured to read the current accumulation result from the first storage address in the storage unit 111 in the computing device 110.

In this way, the accumulation in the warp in the vector processing unit may be decoupled to dedicated hardware for parallel processing, which facilitates the warp to process vector operations other than accumulation, such as a subsequent batch of vector operations, and overall accumulation performance may thus be significantly improved.

In some embodiments, the first storage address stores a previous accumulation result, and in this case, the accumulation computing unit 112 may be configured to obtain a stored accumulation result from the first storage address in the storage unit 111 in response to the first warp accumulation instruction. The accumulation computing unit 112 may be further configured to generate the current accumulation result based on the stored accumulation result and the plurality of first values.

In this way, multiple accumulations within the warp may be implemented by the computing device.

In some embodiments, the accumulation computing unit 112 may be configured to sequentially accumulate a predetermined number of first values among the plurality of first values to generate a plurality of intermediate accumulation results in response to the first warp accumulation instruction. The predetermined number includes but not limited to 4, 8, 16, and so on, for example. The plurality of intermediate accumulation results may be stored in a register or a cache in the accumulation computing unit 112, for example. The accumulation computing unit 112 may be further configured to accumulate the plurality of intermediate accumulation results to generate the current accumulation result.

32 first values (e.g., A1 to A32) and the predetermined number of 8 are treated as an example for description herein. The accumulation computing unit 112 may be configured to accumulate the first values A1 to A8 to obtain an intermediate accumulation result M1, accumulate the first values A9 to A16 to obtain an intermediate accumulation result M2, accumulates the first values A17 to A24 to obtain an intermediate accumulation result M3, accumulate the first values A25 to A32 to obtain an intermediate accumulation result M4, and finally accumulate the intermediate accumulation results M1 to M4 to generate the current accumulation result.

In this way, the predetermined number of values among the plurality of first values are sequentially accumulated through a plurality of cycles, and there is no need to perform one-time accumulation according to the number of lanes, so hardware costs are reduced.

Figure 2:
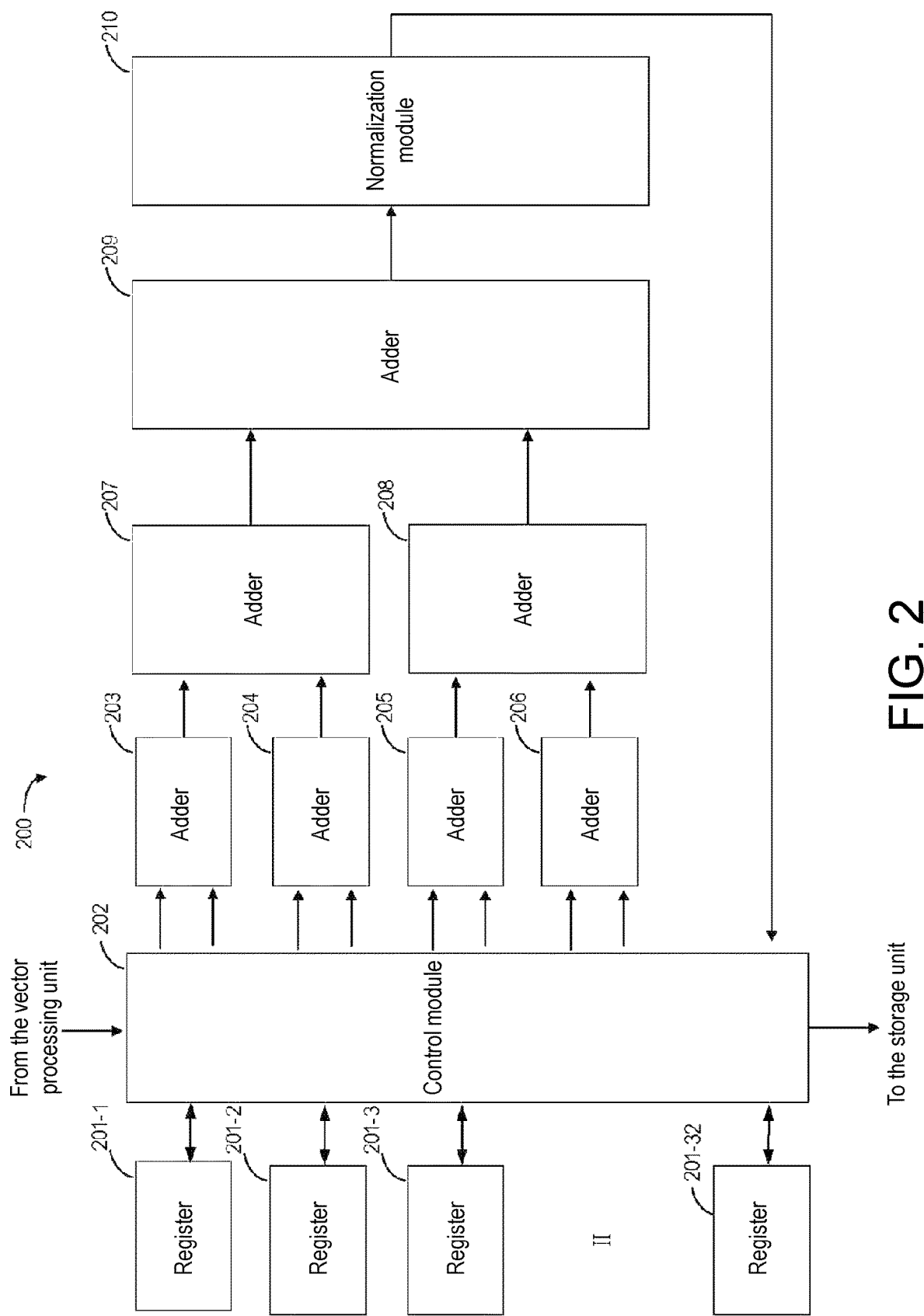
FIG. 2 is a schematic block diagram of an accumulation computing unit 200 according to an embodiment of the disclosure.

FIG. 2 is a schematic block diagram illustrating an accumulation computing unit 200 according to an embodiment of the disclosure.

As shown in FIG. 2, the accumulation computing unit 200 may include 32 registers 201-1 to 201-32 for storing 32 floating point numbers received from the vector processing unit.

The accumulation computing unit 200 may also include a control module 202 configured to obtain 8 floating point numbers from the first batch of 8 registers (e.g., the registers 201-1 to 201-8) and outputs the 8 floating point numbers to four adders 203 to 206. The adders 203 to 206 are configured to add each pair of the 8 floating point numbers to generate 4 first accumulation results and to output the 4 first accumulation results to adders 207 to 208. The adders 207 to 208 are configured to add each pair of the 4 first accumulation results to generate 2 second accumulation results and to output the 2 second accumulation results to an adder 209. The adder 209 is configured to add the 2 second accumulation results to generate a third accumulation results and to output the third accumulation result to a normalization module 210. The normalization module 210 is configured to normalize the third accumulation result to generate a first intermediate accumulation result and to output the first intermediate accumulation result to the control module 202. The control module 202 may be configured to store the first intermediate accumulation result in a register (e.g., any one of the registers 201-1 to 201-8) in which the floating point numbers are accumulated.

The control module 202 may be further configured to obtain 8 floating point numbers from the second batch of 8 registers (e.g., the registers 201-9 to 201-16), output the 8 floating point numbers to the 4 adders 203 to 206, and obtain a second intermediate accumulation result through the adders 207 to 209 and the normalization module 210. The control module 202 may be configured to store the second intermediate accumulation result in a register (e.g., any one of the registers 201-9 to 201-16) in which the floating point numbers are accumulated.

The control module 202 may be further configured to obtain 8 floating point numbers from the third batch of 8 registers (e.g., the registers 201-17 to 201-24), output the 8 floating point numbers to the 4 adders 203 to 206, and obtain a third intermediate accumulation result through the adders 207 to 209 and the normalization module 210. The control module 202 may be configured to store the third intermediate accumulation result in a register (e.g., any one of the registers 201-17 to 201-24) in which the floating point numbers are accumulated.

The control module 202 may be further configured to obtain 8 floating point numbers from the fourth batch of 8 registers (e.g., the registers 201-25 to 201-32), output the 8 floating point numbers to the 4 adders 203 to 206, and obtain a fourth intermediate accumulation result through the adders 207 to 209 and the normalization module 210. The control module 202 may be configured to store the fourth intermediate accumulation result in a register (e.g., any one of the registers 201-25 to 201-32) in which the floating point numbers are accumulated.

The control module 202 may be further configured to obtain the 4 intermediate accumulation results from the 4 registers storing the intermediate accumulation results, and output the 4 intermediate accumulation results to the 4 adders 203 to 206. The other 4 inputs in the adders 203 to 206 are zeros. The current accumulation result is obtained through the adders 207 to 209 and the normalization module 210.

The control module 202 may be configured to store the current accumulation result to the first storage address in the storage unit.

The adders 203 to 209 may be implemented by using any suitable floating point addition circuit, and the normalization module 210 may be implemented by using any suitable floating point normalization circuit. The control module 202 may be implemented by using any circuit.

It should be understood that the block diagram shown in FIG. 2 is only an example, the accumulation computing unit may adopt any suitable structure, and the scope of the disclosure is not limited herein.

In this way, the 8 floating point numbers among the 32 floating point numbers are sequentially accumulated through multiple cycles, and there is no need to perform one-time accumulation according to 32 lanes, so hardware costs are reduced.

Alternatively or additionally, in some embodiments, the accumulation computing unit 112 may be configured to receive a second warp accumulation instruction, a plurality of second values corresponding to the warp lane number, and a second storage address from the vector processing unit 120. The second warp accumulation instruction, the plurality of second values, and the second storage address may be associated with a second warp in the vector processing unit 120. In some embodiments, the second warp may be the same as the first warp, and in this case, the second storage address may be the same as the first storage address. In some embodiments, the second warp may be the different from the first warp, and in this case, the second storage address may be different from the first storage address.

The accumulation computing unit 112 may be further configured to determine whether the second storage address and the first storage address are identical in response to the second warp accumulation instruction.

The accumulation computing unit 112 may be further configured to store the current accumulation result in the first storage address in the storage unit 111 to be read by the vector processing unit 120 if it is determined that the second storage address is different from the first storage address.

The accumulation computing unit may be further configured to update the current accumulation result based on the plurality of second values if it is determined that the second storage address and the first storage address are identical. The current accumulation result before and after the update is not stored in the storage unit 111 but is stored in the accumulation computing unit 112 instead, for example, in a register in the accumulation computing unit 112.

In this way, after the current accumulation result is generated, the current accumulation result is temporarily stored in the accumulation computing unit 112, such as a register or a cache, and the current accumulation result is then stored in the storage unit 111 only when a different storage address is subsequently received. Therefore, in the case of accumulation in the same warp, accessing performed on the storage unit 111 is decreased, and computing efficiency is thereby improved.

Figure 3:
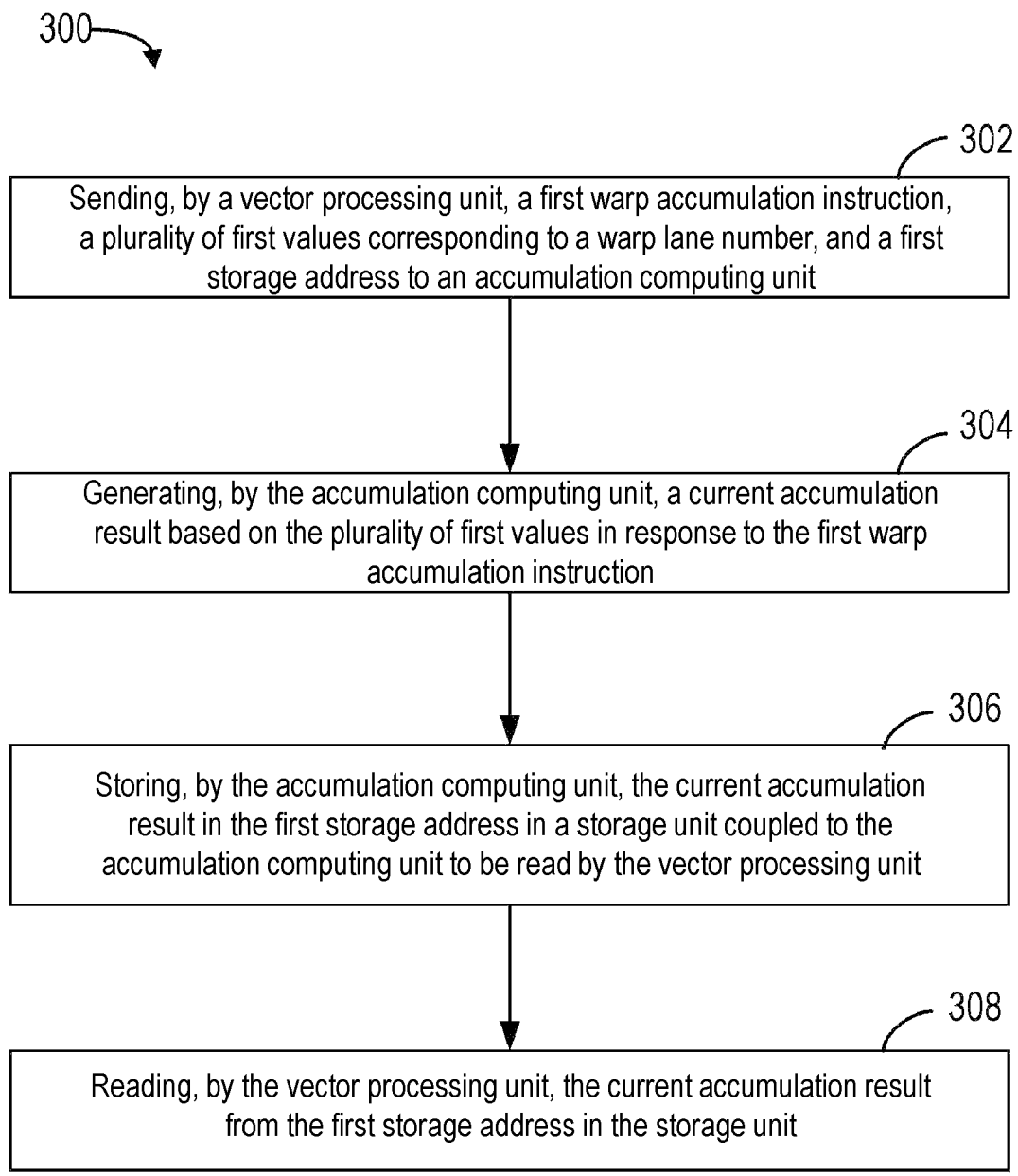
FIG. 3 is schematic flow chart of a method 300 of warp accumulation according to an embodiment of the disclosure.

FIG. 3 is schematic flow chart illustrating a method 300 of warp accumulation according to an embodiment of the disclosure. It should be understood that method 300 may also include additional blocks that are not shown and/or blocks that are shown but may be omitted, and the scope of the disclosure is not limited in this regard.

At block 302, the vector processing unit 120 sends the first warp accumulation instruction, the plurality of first values corresponding to the warp lane number, and the first storage address to the accumulation computing unit 112.

At block 304, the accumulation computing unit 112 may generate the current accumulation result based on the plurality of first values in response to the first warp accumulation instruction.

At block 306, the accumulation computing unit 112 may store the current accumulation result in the first storage address in the storage unit 111 to be read by the vector processing unit 120.

At block 308, the vector processing unit 120 reads the current accumulation result from the first storage address in the storage unit 111.

In this way, the accumulation in the warp of the vector processing unit may be decoupled to the dedicated hardware for parallel processing, which facilitates the warp to process vector operations other than accumulation, such as a subsequent batch of vector operations, and overall accumulation performance may thus be significantly improved.

Figure 4:
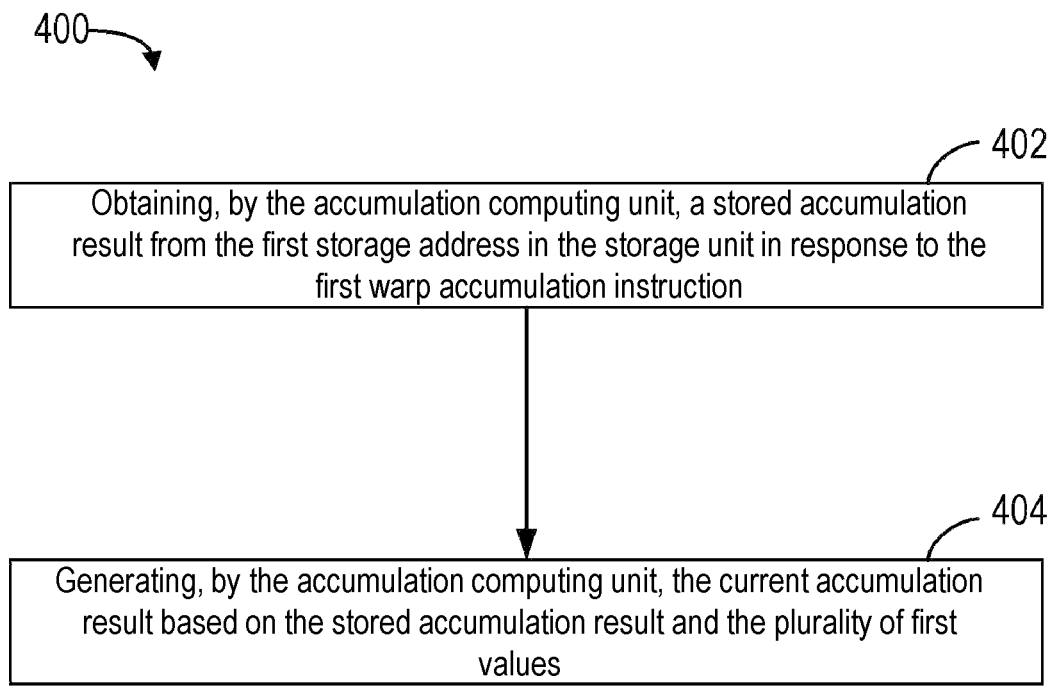
FIG. 4 is schematic flow chart of a method 400 of generating a current accumulation result according to an embodiment of the disclosure.

FIG. 4 is schematic flow chart of a method 400 of generating a current accumulation result according to an embodiment of the disclosure. For instance, the method 400 may be performed by accumulation computing unit 112 in FIG. 1. It should be understood that method 400 may also include additional blocks that are not shown and/or blocks that are shown but may be omitted, and the scope of the disclosure is not limited in this regard.

At block 402, the accumulation computing unit 112 obtains a stored accumulation result from the first storage address in the storage unit 111 in response to the first warp accumulation instruction.

At block 404, the accumulation computing unit 112 may generate the current accumulation result based on the stored accumulation result and the plurality of first values.

In this way, multiple accumulations in the warp may be implemented through accumulation computing unit and the storage unit.

Figure 5:
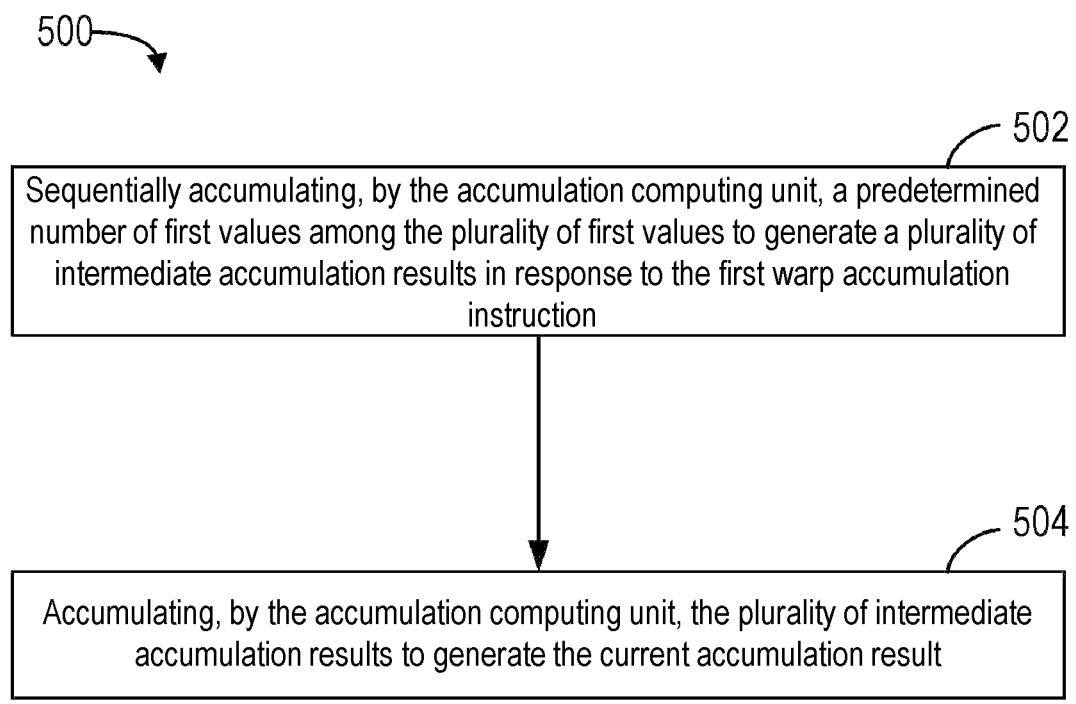
FIG. 5 is schematic flow chart of a method 500 of generating a current accumulation result according to another embodiment of the disclosure.

FIG. 5 is schematic flow chart of a method 500 of generating a current accumulation result according to another embodiment of the disclosure. For instance, the method 500 may be performed by accumulation computing unit 112 in FIG. 1. It should be understood that method 500 may also include additional blocks that are not shown and/or blocks that are shown but may be omitted, and the scope of the disclosure is not limited in this regard.

At block 502, the accumulation computing unit 112 sequentially accumulates the predetermined number of first values among the plurality of first values to generate the plurality of intermediate accumulation results in response to the first warp accumulation instruction.

At block 504, the accumulation computing unit 112 accumulates the plurality of intermediate accumulation results to generate the current accumulation result.

In this way, the predetermined number of values among the plurality of first values are sequentially accumulated through a plurality of cycles, and there is no need to perform one-time accumulation according to the number of lanes, so hardware costs are reduced.

Alternatively or additionally, in some embodiments, the vector processing unit 120 may further send the second warp accumulation instruction, the plurality of second values corresponding to the warp lane number, and the second storage address to the accumulation computing unit 112.

Next, the accumulation computing unit 112 may determine whether the second storage address and the first storage address are identical in response to the second warp accumulation instruction.

The accumulation computing unit 112 may store the current accumulation result in the first storage address in the storage unit 111 to be read by the vector processing unit 120 if it is determined that the second storage address is different from the first storage address. After that, the accumulation computing unit 112 may generate an additional accumulation result based on the plurality of second values and stores the additional accumulation result in the second storage address in the storage unit 111.

The accumulation computing unit 112 updates the current accumulation result based on the plurality of second values if it is determined that the second storage address and the first storage address are identical.

In this way, after the current accumulation result is generated, the current accumulation result is temporarily stored in the accumulation computing unit, such as a register or a cache, and the current accumulation result is then stored in the storage unit only when a different storage address is subsequently received. Therefore, in the case of accumulation in the same warp, accessing performed on the storage unit is reduced, and computing efficiency is thereby improved.

A person having ordinary skill in the art can understand that the method steps described herein are not limited to the order shown exemplarily in the drawings, but can be executed in any other feasible order.

Various implementations of the system and techniques described in the foregoing paragraphs may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), computer hardware, firmware, software, and/or a combination thereof.

The above description of the disclosure is used to enable any person having ordinary skill in the art to implement or use the disclosure. Various modifications of the disclosure are obvious to a person having ordinary skill in the art, and the general principles defined herein may also be applied to other modifications without departing from the spirit and protection scope of the disclosure. Therefore, the disclosure is not limited to the examples and designs described herein, but is consistent with the broadest scope of the principles and novel features disclosed herein.

What is claimed is:

1. A computing device, comprising:
   a storage unit; and
   an accumulation computing unit, coupled to the storage unit, wherein the accumulation computing unit is configured to:
   receive, from a vector processing unit coupled to the computing device, a first warp accumulation instruction, a plurality of first values corresponding to a warp lane number, and a first storage address;
   generate a current accumulation result based on the plurality of first values in response to the first warp accumulation instruction; and
   store the current accumulation result in the first storage address in the storage unit to be read by the vector processing unit.

2. The computing device according to claim 1, wherein the accumulation computing unit is further configured to:
   obtain, from the first storage address in the storage unit, a stored accumulation result in response to the first warp accumulation instruction; and
   generate the current accumulation result based on the stored accumulation result and the plurality of first values.

3. The computing device according to claim 1, wherein the accumulation computing unit is further configured to:
   sequentially accumulate a predetermined number of first values among the plurality of first values to generate a plurality of intermediate accumulation results in response to the first warp accumulation instruction; and accumulate the plurality of intermediate accumulation results to generate the current accumulation result.

4. The computing device according to claim 1, wherein the accumulation computing unit is further configured to:

receive, from the vector processing unit, a second warp accumulation instruction, a plurality of second values corresponding to the warp lane number, and a second storage address;

determine whether the second storage address and the first storage address are identical in response to the second warp accumulation instruction;

store the current accumulation result in the first storage address in the storage unit to be read by the vector processing unit if it is determined that the second storage address is different from the first storage address; and update the current accumulation result based on the plurality of second values if it is determined that the second storage address and the first storage address are identical.

5. The computing device according to claim 1, wherein the computing device comprises a load store unit.

6. A computing apparatus, comprising:

the computing device according to claim 1; and the vector processing unit, coupled to the computing device, wherein the vector processing unit is configured to:

send the first warp accumulation instruction, the plurality of first values corresponding to the warp lane number, and the first storage address to the accumulation computing unit in the computing device; and read the current accumulation result from the first storage address in the storage unit in the computing device.

7. A method of warp accumulation, comprising sending, by a vector processing unit, a first warp accumulation instruction, a plurality of first values corresponding to a warp lane number, and a first storage address to an accumulation computing unit;

generating, by the accumulation computing unit, a current accumulation result based on the plurality of first values in response to the first warp accumulation instruction;

storing, by the accumulation computing unit, the current accumulation result in the first storage address in a storage unit coupled to the accumulation computing unit to be read by the vector processing unit; and reading, by the vector processing unit, the current accumulation result from the first storage address in the storage unit.

8. The method according to claim 7, wherein generating, by the accumulation computing unit, the current accumulation result further comprises:

obtaining, by the accumulation computing unit, a stored accumulation result from the first storage address in the storage unit in response to the first warp accumulation instruction; and generating, by the accumulation computing unit, the current accumulation result based on the stored accumulation result and the plurality of first values.

9. The method according to claim 7, wherein generating, by the accumulation computing unit, the current accumulation result further comprises:

sequentially accumulating, by the accumulation computing unit, a predetermined number of first values among the plurality of first values to generate a plurality of intermediate accumulation results in response to the first warp accumulation instruction; and accumulating, by the accumulation computing unit, the plurality of intermediate accumulation results to generate the current accumulation result.

10. The method according to claim 7, further comprising:

sending, by the vector processing unit, a second warp accumulation instruction, a plurality of second values corresponding to the warp lane number, and a second storage address to the accumulation computing unit;

determining, by the accumulation computing unit, whether the second storage address and the first storage address are identical in response to the second warp accumulation instruction;

storing, by the accumulation computing unit, the current accumulation result in the first storage address in the storage unit to be read by the vector processing unit if it is determined that the second storage address is different from the first storage address; and updating, by the accumulation computing unit, the current accumulation result based on the plurality of second values if it is determined that the second storage address and the first storage address are identical.

* * * * *